United States Patent [19]

White et al.

[11] Patent Number: 5,559,286

[45] Date of Patent: Sep. 24, 1996

[54] VEHICLE FRICTION MATERIAL CONDITION MEASUREMENT SYSTEM

[75] Inventors: Jay D. White, Galesburg; James R. Clark, Plainwell; LaVerne A. Caron, Kalamazoo, all of Mich.

[73] Assignee: Eaton Corporation, Cleveland, Ohio

[21] Appl. No.: 541,537

[22] Filed: Oct. 10, 1995

[51] Int. Cl.[6] ........................... G01L 5/28
[52] U.S. Cl. .......................... 73/129; 340/454
[58] Field of Search ...................... 340/453, 454; 73/121, 129

[56] References Cited

U.S. PATENT DOCUMENTS

| | | | |
|---|---|---|---|
| 1,957,051 | 5/1934 | Norton | 73/32 |
| 2,117,027 | 5/1938 | Langbein | 73/341 |
| 2,494,269 | 1/1950 | Sparkes | 177/311 |
| 3,088,549 | 5/1963 | Borsa | 188/1 |
| 3,314,618 | 4/1967 | McDonald | 241/299 |
| 3,321,045 | 5/1967 | Veilleux | 188/1 |
| 3,398,246 | 8/1968 | Linet | 200/61.4 |
| 3,556,258 | 1/1971 | Winge et al. | 188/1 |
| 3,674,114 | 7/1972 | Howard | 200/61.4 |
| 3,689,880 | 9/1972 | McKee et al. | 200/61.4 |
| 3,800,278 | 3/1974 | Jaye et al. | 340/52 A |
| 3,805,228 | 4/1974 | Peeples | 340/52 A |
| 3,825,891 | 7/1974 | Kinast | 340/52 A |
| 3,914,734 | 10/1975 | Rigalt | 340/52 A |
| 4,016,533 | 4/1977 | Ishikawa et al. | 340/52 A |
| 4,147,236 | 4/1979 | Steffen et al. | 188/1 A |
| 4,188,613 | 2/1980 | Yang et al. | 340/52 A |
| 4,204,190 | 5/1980 | Wiley et al. | 340/52 A |
| 4,241,603 | 12/1980 | Han et al. | 73/129 |
| 4,298,857 | 11/1981 | Robins et al. | 340/52 A |
| 4,387,789 | 6/1983 | Borugian | 188/1.11 |
| 4,508,196 | 4/1985 | Jamon | 188/1.11 |
| 4,520,661 | 6/1985 | Tamai et al. | 73/129 |
| 4,562,421 | 12/1985 | Duffy | 200/61.4 |
| 4,604,604 | 8/1986 | Mann | 340/52 A |
| 4,606,435 | 8/1986 | Johnson | 340/52 A |
| 4,641,519 | 2/1987 | Klein et al. | 73/129 |
| 4,646,001 | 2/1987 | Baldwin et al. | 324/65 P |
| 4,674,326 | 6/1987 | Reinecke | 73/129 |
| 4,824,260 | 4/1989 | Novotny et al. | 374/179 |
| 4,869,350 | 9/1989 | Fargier et al. | 188/1.11 |
| 5,151,681 | 9/1992 | Valmir et al. | 340/454 |
| 5,168,260 | 12/1992 | Mery | 340/454 |
| 5,189,391 | 2/1993 | Feldmann et al. | 73/129 |
| 5,302,940 | 4/1994 | Chen | 340/454 |
| 5,307,673 | 5/1994 | Ito et al. | 73/129 |
| 5,419,415 | 5/1995 | Lamb et al. | 188/1.11 |

FOREIGN PATENT DOCUMENTS

| | | | |
|---|---|---|---|
| 2319880 | of 1977 | France | G01D 21/02 |
| 0273801 | 6/1988 | France | F16D 66/02 |
| 2060985 | 6/1972 | Germany | 73/129 |
| 0297429 | 6/1988 | Germany | F16D 66/00 |
| 4231107 | 3/1994 | Germany | F16D 66/02 |
| 0418360 | 8/1974 | U.S.S.R. | 73/129 |
| 2255145 | 4/1991 | United Kingdom | F16D 66/02 |

*Primary Examiner*—Richard Chilcot
*Assistant Examiner*—George M. Dombroske
*Attorney, Agent, or Firm*—Loren H. Uthoff, Jr.; Howard D. Gordon

[57] ABSTRACT

A sensor which responds to both changes in working length and temperature is embedded in a friction lining to provide a signal indicative of both wear and temperature to an electronic control unit which interprets long term averaged change in the sensor resistance measured when the vehicle is stationary as lining wear and short term changes in sensor resistance as representative of lining temperature.

12 Claims, 2 Drawing Sheets

5,559,286

VEHICLE FRICTION MATERIAL CONDITION MEASUREMENT SYSTEM

BACKGROUND OF THE INVENTION

1. Field of the Invention

The present invention relates to a system for the continuous monitoring of temperature and wear of a vehicle friction material. More specifically, the present invention relates to a system for the monitoring of temperature and wear of a vehicle friction material where an electrically resistive sensor is used to measure temperature and/or wear embedded in the brake lining.

2. Description of the Prior Art

The prior art is replete with devices to signal when a brake lining has worn to the extent where relining is necessary. U.S. Pat. Nos. 2,217,176; 2,814,684; 3,271,737; 3,297,985; 3,440,604; 3,553,642; 3,660,815 and 3,689,880 are examples of such systems, the disclosures of which are hereby incorporated by reference. All of these systems signal only when the brake lining wears to a predetermined thickness whereupon a signal is transmitted to indicate that service is required. U.S. Pat. No. 3,805,228 discloses a brake wear sensor where a plurality of preselected brake lining wear points are signaled by embedded sensors, each of which complete an electrical circuit when the lining wears to each predetermined thickness point.

Measuring brake temperature has been commonly accomplished by embedding a thermocouple into the brake lining. An example of such a method is shown in U.S. Pat. No. 3,674,114. The single function of the embedded thermocouple is to measure internal brake lining temperature with no wear monitoring capability.

Although the aforementioned prior art monitoring systems do give an indication of the state of the brake lining, none have proved satisfactory in the marketplace due to reliability problems, high cost, complication and performance limitations. These concepts are also susceptible to generating false signals due to contamination thereby triggering a premature servicing event. Most all the wear sensors only signal when the lining has worn to selected points without a continuous measurement capability and do not provide temperature sensing. Thus, using prior art techniques, two sensors are required to measure both lining wear and temperature.

SUMMARY OF THE INVENTION

The present invention provides a system to use a single sensor to monitor both the wear and temperature of a vehicle brake lining. A thermistor or other similar device is embedded in the lining of the brake shoe and its resistance is monitored using a microprocessor based electronic control unit (ECU). Long term changes in the resistance of the thermistor measured after the vehicle has been stationary over a period of time indicate wear of the lining whereas relatively short term changes made when the vehicle is operating indicate temperature gradients. The ECU determines the proper classification of a change in thermistor resistance and provides an output signal to the vehicle operator and/or stores signals for later read-out on external diagnostic equipment.

The present invention is described as being embedded in a brake lining so as to detect brake condition, however, these concepts are equally adaptable for use in a vehicle clutch to measure wear of the clutch plate friction material or for use in other types of friction based power transfer devices.

One provision of the present invention is to embed a thermistor or other similar device into a brake lining to monitor brake wear.

Another provision of the present invention is to embed a thermistor or other similar device into a brake lining to monitor brake temperature.

Another provision of the present invention is to use a single sensing device to measure both the wear and temperature of a brake lining.

Another provision of the present invention is to use a thermistor or other similar device based sensor embedded in a brake lining to measure both the wear and temperature of the brake lining.

Still another provision of the present invention is to use a thermistor or other similar device to measure both the wear and temperature of a brake lining by characterizing longer term changes in the output of the thermistor after the vehicle has been stationary as indicative of the wear state of the lining and shorter term changes in the output of the thermistor when the vehicle is operating as indicative of the temperature of the lining.

DETAILED DESCRIPTION OF THE PREFERRED EMBODIMENT

Figure 1:
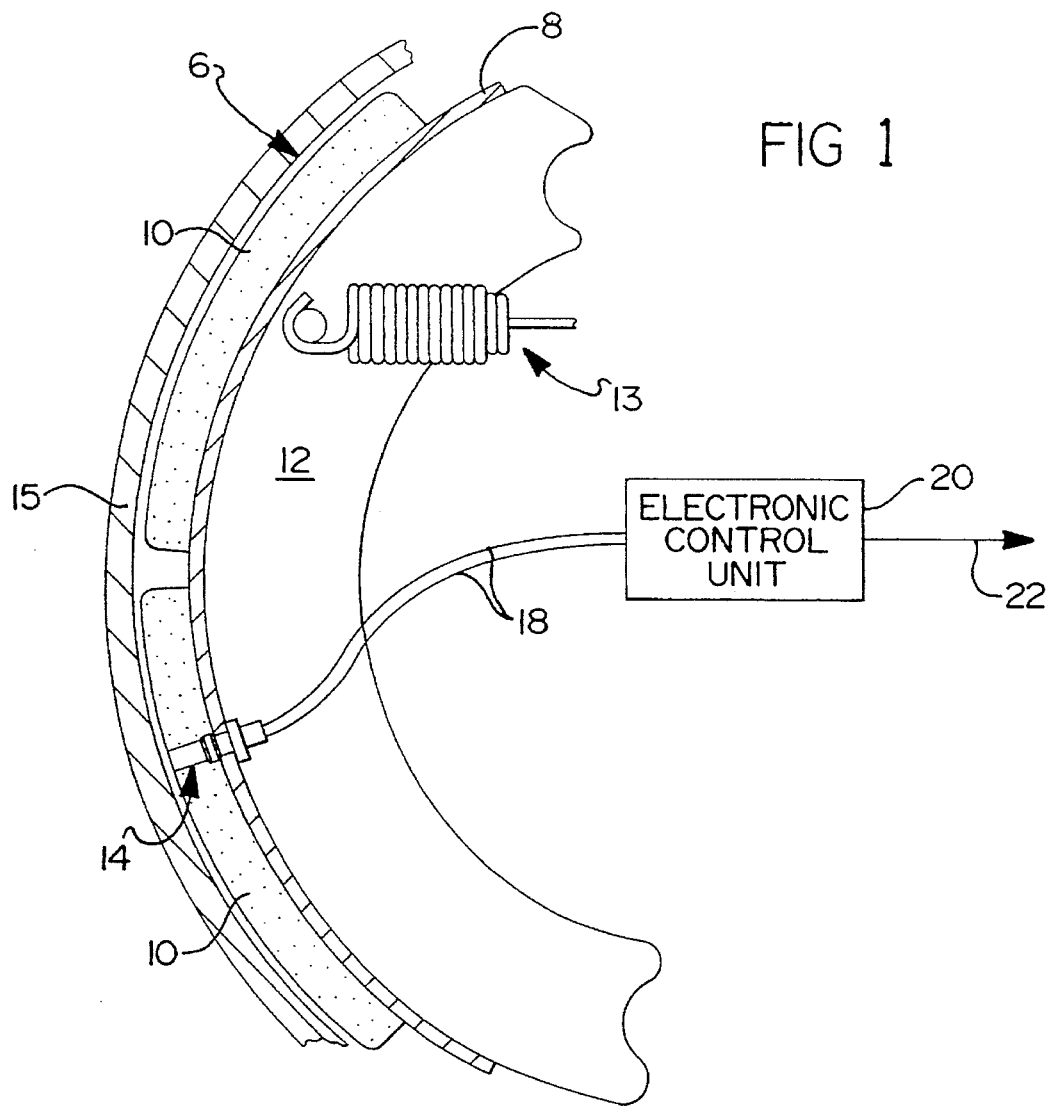
FIG. 1 is a cross-sectional view of the brake lining sensor of the present invention installed in a brake shoe.

Certain terminology will be used in the following description for convenience in reference only and will not be limiting. The words "outwardly", "downwardly", "rightwardly", "leftwardly", "clockwise", and "counterclockwise" will designate directions in the drawings in which references are made. The words "inwardly" and "outwardly" will refer to directions toward and away from, respectively, the center of the vehicle (not shown) to which the brake is mounted. Said terminology will include the words above specifically mentioned, derivatives thereof and words of similar import. The term "brake" as used herein is intended to include various friction coupling devices such as clutches, brakes and the like.

FIG. 1 illustrates a cross-sectional view of a brake shoe 6 having a sensor 14 embedded in the brake lining 10. The lining 10 is riveted or bonded to a brake table 8 where the brake table 8 is in turn attached to and supported by the brake web 12. A return spring 13 returns the brake shoe 6 into a retracted position upon deactivation such that the brake lining 10 does not frictionally contact the brake drum 15. The sensor 14 is electrically connected by way of connection wires 18 to an electronic control unit 20. The electronic control unit 20 processes the signals generated by the sensor 14 to interpret the output and generate an output signal on line 22 which represents the level of wear of the lining 10 and/or the temperature of the lining 10. Sensor 14 is preferably a thermistor portion of which has been molded into the brake lining 10.

Figure 2:
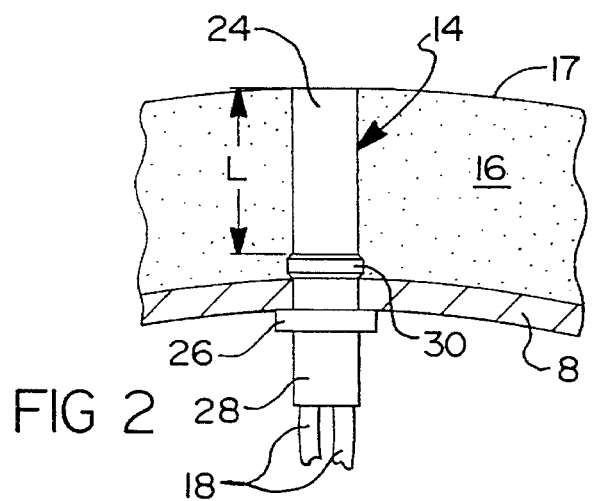
FIG. 2 is a partial cross-sectional view of the brake shoe of FIG. 1 showing in more detail the brake lining sensor of the present invention.

Now referring to FIG. 2, a partial cross-sectional view of the sensor 14 mounted to the brake table 8 and a sensing element 24 is embedded in the brake lining 16. The sensor 14 is of the type commonly known as a Positive Temperature Coefficient (PTC) thermistor which electrically responds by changes in its resistance value to both temperature and to wear as determined by the length L of the sensing element 24. To secure the sensor 14 to the brake table 8, a fastener 26 is used on the inside of the brake table 8 and a bubble portion 30 is positioned on the outside of the brake table 8 thereby securing the sensor 14 to the brake shoe 6.

The brake lining 16 is molded around the sensor 14 and retains the sensor 14 in position. Thus, during fabrication or relining, the sensor 14 comes molded in the brake lining 16. The lining 16 is bonded or riveted to the brake table 8 where the sensor 14 is inserted through an aperture in the brake table 8 and secured using fastener 26. The connection wires 18 are electrically connected to a sensing element 24 and are potted into the sensor housing 28 for sealing from the environment and the sensor housing 28 provides a secure area for connection to the sensing element 24. The sensing element 24 is preferably a PTC type of thermistor which changes its resistance value depending on the working length L of the sensing element 24 and its temperature. Any type of material that possesses these characteristics could be used for the sensing element 24.

FIG. 2 illustrates the preferred embodiment where the sensing element 24 extends from the brake table 8 to the operating surface 17 of the brake lining 16. The effective operating length L of the sensing element 24 of the sensor 14 decreases as the brake lining 16 decreases in thickness due to wear. As the operating length L decreases, the resistance value of the sensor 14 increases in relative proportion thus representing the remaining thickness of the brake lining 16. As the thickness of the braking lining 14 decreases the resistance of the sensor 14 is monitored by the ECU 20. Abnormal wear rates and service needs are outputs from the ECU which can be outputted to the vehicle operator or to an external diagnostic monitor via line 22.

Figure 3:
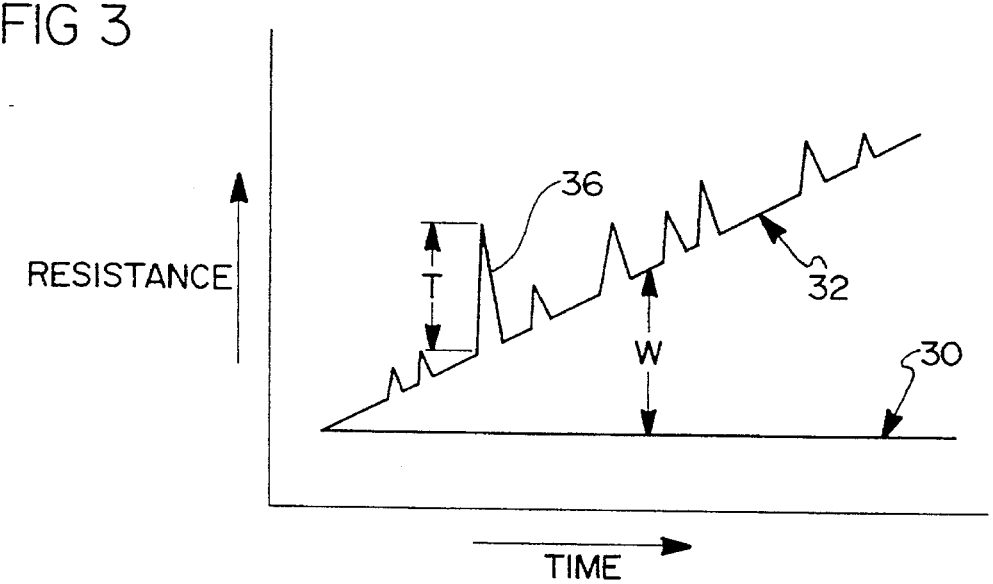
FIG. 3 is a graph of the resistance versus time of the lining sensor of the present invention.

FIG. 3 is a graph showing the resistance value of the sensing element 24 verses time over a typical segment of the operating life of the brake shoe 6. Shown is both a brake lining 16 wear indication and a thermal event. The processing of the resistance of the sensing element 24 is performed within the electronic control unit 20 which generates a signal representing the condition of the friction element (brake lining 16) on output line 22 for communication to the truck cab or to an external diagnostic system. Signals generated on line 22 could indicate when the brake lining 16 has reached its service limit and/or exceeded a given maximum recommended operating temperature or cumulative temperature history. A much more sophisticated analysis could be performed by the electronic control unit 20 as needed to calculate brake condition.

FIG. 3 illustrates the change in the resistance of the sensor 14 as the brake lining 16 wears causing the sensor length L of the sensing element 24 to become shorter and the resistance value to increase with time as indicated by wear resistance line 32 as compared to the beginning resistance indicated by datum line 30. The datum line 30 represents the baseline resistance of the sensor 14 if no wear occurs at a given ambient temperature. The electronic control unit 20 continuously interprets the resistance value of the sensor 14 and also monitors the resistance value after the vehicle has been stationary for a relatively long period of time to allow for cooling of the brake lining 16 to ambient temperature. The resistance value measured after the vehicle has been stationary for a given period of time is compared and averaged by the ECU 20. If the average values change, the magnitude of the change represents the decrease in friction lining 14 thickness due to wear. The resistance value is averaged over time so that changes in the ambient temperature do not affect the calculation of lining wear to any significant extent. The difference in the resistance value at the datum line 30 and the wear resistance line 32 is shown as W and is indicative of the thickness that has been worn from the brake lining 16.

As the brake is applied, the temperature of the brake lining 16 rapidly increases due to frictional contact between the lining 16 and the brake drum 15. The thermal heating of the lining 16 causes the resistance of the sensor 14 to increase as shown by the thermal event 36 which results in a short term change in amplitude (increase) in resistance of T. The electronic control unit 20 logs the thermal events for both time and duration for subsequent calculation of brake life operational history and performance. The information is then provided to the vehicle cab or an external diagnostic unit through connection with output line 22.

In summary, the electrical resistance of the sensor 14 increases as its working length L is reduced due to wear of the brake lining 16. The electrical resistance of the sensor 14 will also change with its temperature where an increase in temperature also increases the resistance value of the sensing element 24. Wear of the brake lining 16 is calculated based on a relatively long term change in the resistance value of the sensor 14 while temperatures of the brake lining 16 are calculated based on relatively short term changes in the resistance value of the sensor 14.

Figure 4:
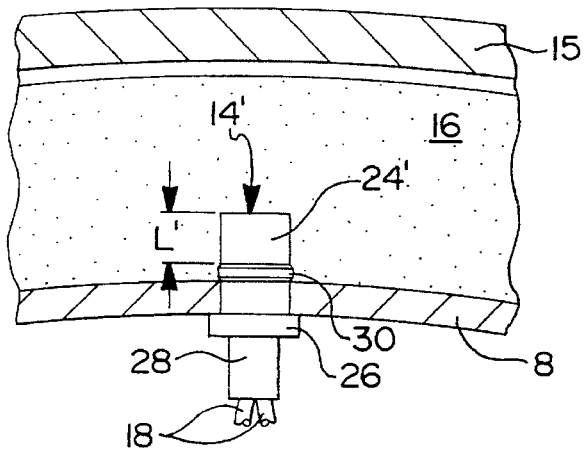
FIG. 4 is an alternate embodiment of the brake lining sensor of the present invention.

Now referring to FIG. 4, a cross-sectional view of an alternate embodiment of the brake wear sensor 14 of the present invention is shown. Essentially, the working length L' of the sensing element 24' has been reduced such that it extends into the brake lining 16 only to the extent that a brake service condition would occur if the lining 16 wears down such that the sensing element 24' contacts the brake drum 15. Thus, the resistance value of the sensor 14 changes with a change in temperature until the brake lining 16 wears to the point that the sensing element 24' contacts the brake drum 15 whereupon the resistance is drastically reduced signaling the need for replacement of the brake lining 16. This permanent shift in resistance value is interpreted as brake wear out and occurs at the service limit of the lining 14. Thus, contact of the sensing element 24' with the brake drum 15 greatly reduces the resistance value of the sensor 14 such that the service limit of the brake lining 16 is clearly signaled to the ECU 20.

Figure 5:
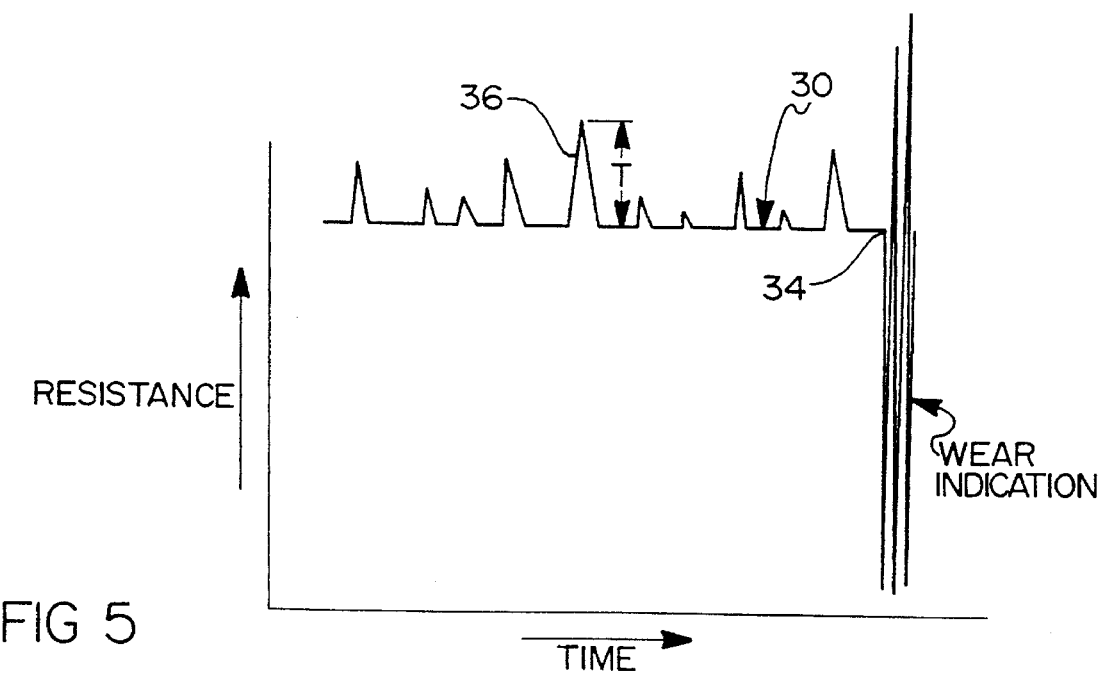
FIG. 5 is a graph of the resistance versus time of the alternate embodiment of the present invention as shown in FIG. 4.

FIG. 5 is a graph showing the resistance versus time of the alternate embodiment of the brake lining wear sensor 14' as shown in FIG. 4. The long term resistance value of the sensor 14' does not change from the datum line 30 until the lining 16 wears to the end of the sensing element 24 shown at point 34 on the graph where the sensing element 24 is designed to yield a large variation in resistance acting similar to a switching element that is easily recognized by the ECU 20 when they signal that the lining 16 has worn to the extent that servicing is required. The short term resistance of the sensor 14' changes dramatically as shown beginning at point 34 where the resistance increases significantly when the sensing element 34' goes open circuit and decreases significantly when the sensing element 34' is shorted by the brake drum 15. During the period that the lining 16 has remaining material exceeding the service limit, the resistance of the sensor 14' remains relatively constant at the datum line 30 value (as long as the temperature remains constant). Temperature excursions cause the sensing element 24', (preferably a PTC type thermistor) to respond in such a manner that its value of resistance increases with increasing temperature as shown by the labeled thermal event 36 where the value of the resistance increases by T. The electronic control unit 20 interprets this increase in resistance and correlates it to a temperature increase for tasks such as logging, calculation of brake performance and life prediction. This information can then be made available to the vehicle operator or to an external diagnostic unit through output line 22.

Although this invention has been described in its preferred embodiment with a certain degree of particularity, it is understood such description is by way of example only and that certain modifications are possible within the spirit and the scope of the invention as hereinafter claimed.

We claim:

1. In a frictional power transfer device including a friction lining mounted to a support member having a wearing surface engageable with a power transfer surface, the combination comprising an electrically resistive sensor embedded within said friction lining extending from said support member to said wearing surface having a value of resistance dependent on both a temperature and a length of said sensor and oriented such that wear of the friction lining results in wear of said sensor and a reduction in the length of said sensor thereby changing said value of resistance of said sensor, an insulated connector in electrical connection with said sensor and with an electronic control unit for monitoring and interpreting said value of resistance and then calculating the wear and temperature of said friction lining.

2. The frictional power transfer device of claim 1, wherein said electrically resistive sensor is a thermistor.

3. The frictional power transfer device of claim 1, wherein said electronic control unit generates an output signal indicative of the wear and temperature history of said friction lining and communicates said output signal to a vehicle operator over an output line.

4. The method of sensing the wear and temperature of a friction lining in a vehicle of claim 1, wherein said wear state and said temperature are processed and stored in said electronic control unit.

5. The method of sensing the wear and temperature of a friction lining in a vehicle of claim 4, wherein said wear state and said temperatures are transmitted to a vehicle cab for interpretation by an operator.

6. The method of sensing the wear and temperature of a friction lining in a vehicle of claim 4, wherein said wear state and said temperatures are transmitted to an external diagnostic unit.

7. The method of sensing the wear and temperature of a friction lining in a vehicle of claim 4, wherein said electronic control unit uses relatively long term changes in said resistance value to calculate said wear state of said friction lining and uses relatively short term changes in said resistance value to calculate a temperature of said friction lining.

8. A method of continuously sensing the wear and temperature of a friction lining in a vehicle comprising:

providing a thermistor embedded in said friction lining oriented such that wear of the friction lining continuously changes a resistance value of said thermistor;

providing an electronic control unit electrically connected to said thermistor;

monitoring said resistance value of said thermistor;

monitoring an operational status of the vehicle;

calculating a wear state of said friction lining based on said resistance value of said thermistor and said operational status;

calculating a temperature of said friction lining based on said resistance value of said thermistor and said operational status.

9. A vehicle brake comprising:

a brake drum for frictional braking of a vehicle;

a brake shoe having a friction lining for frictional engagement with said brake drum and a brake table for supporting said friction lining;

a sensor having a sensing element, said sensing element generating a continuous electrical signal in response to changes in a temperature and a length of said sensing element, said sensing element being embedded in said friction lining and oriented such that wear of said friction lining wears said sensing element thereby reducing the length of said sensing element resulting in a change in said electrical signal generated by said sensing element;

an electrical control unit for processing said electrical signal generated by said sensing element.

10. The vehicle brake of claim 9, wherein said sensing element is a positive temperature coefficient thermistor.

11. The vehicle brake of claim 10, wherein said sensing element extends from said brake table to an outer surface of said friction lining.

12. The vehicle brake of claim 10, wherein said sensing element extends from said brake table to an intermediate thickness of said friction lining.

* * * * *